United States Patent
Kobayashi et al.

(10) Patent No.: US 7,044,516 B2
(45) Date of Patent: May 16, 2006

(54) MOUNTING STRUCTURE OF BUMPER BEAM

(75) Inventors: Akira Kobayashi, Shizuoka-Ken (JP); Hidekazu Takahashi, Shizuoka-Ken (JP); Isao Hakamata, Shizuoka-Ken (JP); Masaaki Suzuki, Shizouka-Ken (JP)

(73) Assignees: Suzuki Motor Corporation, (JP); Kohzu Manufacturing Co., Ltd., (JP)

( * ) Notice: Subject to any disclaimer, the term of this patent is extended or adjusted under 35 U.S.C. 154(b) by 0 days.

(21) Appl. No.: 10/996,511

(22) Filed: Nov. 24, 2004

(65) Prior Publication Data
US 2005/0116498 A1      Jun. 2, 2005

(30) Foreign Application Priority Data
Nov. 27, 2003    (JP)    ............................. 2003-396437

(51) Int. Cl.
*B60R 19/26* (2006.01)

(52) U.S. Cl. ...................................... 293/146; 293/122

(58) Field of Classification Search ................ 293/122, 293/146
See application file for complete search history.

(56) References Cited

U.S. PATENT DOCUMENTS

| | | | | |
|---|---|---|---|---|
| 1,697,498 A | * | 1/1929 | Fageol | 293/146 |
| 5,031,947 A | * | 7/1991 | Chen | 293/135 |
| 5,407,239 A | * | 4/1995 | Arai et al. | 293/146 |
| 6,003,912 A | * | 12/1999 | Schonhoff et al. | 293/122 |
| 2002/0079711 A1 | * | 6/2002 | Kajiwara et al. | 293/133 |

FOREIGN PATENT DOCUMENTS

| | | |
|---|---|---|
| JP | 5-27315 A | 7/1993 |
| JP | 2000-85496 A | 3/2000 |

* cited by examiner

*Primary Examiner*—Joseph D. Pape
(74) *Attorney, Agent, or Firm*—Lerner, David, Littenberg, Krumholdz & Mentlik, LLP

(57) ABSTRACT

A bumper beam assembly for a vehicle comprises a bumper beam having at least two round pipes, a bracket, first and second support members, first and second side frames, and a bracket formed into a rounded shape to match the external shape of the round pipes. The round pipes are arranged vertically and the sum of the diameters of the round pipes is smaller than the height of the bumper beam. The first and second support members have arc-shaped recesses which conform to the external shape of the round pipes and support the round pipes to connect the side frame to the round pipes, and one of the round pipes is positioned below a central point of the first and second side frames, and one of the round pipes is positioned above the central point.

5 Claims, 6 Drawing Sheets

MOUNTING STRUCTURE OF BUMPER BEAM

BACKGROUND OF THE INVENTION

The present invention relates to a mounting structure of a bumper beam on at least one of the front and rear sides of a vehicle.

At lower parts on the front side and rear side of a vehicle, bumpers are provided. Bumpers protect functional parts such as the body and lamps of a vehicle when the vehicle collides with other objects. At the back of a bumper, a bumper beam is provided to absorb shock energy when the vehicle body receives a shock in a collision.

Bumpers come in various shapes depending on the size of the vehicle. Furthermore, because bumpers also play a role in enhancing design properties, bumpers have a variety of different design shapes used in accordance with the vehicle type. Therefore, many types of bumper beams have been manufactured so as to match the bumper shape.

To manufacture a bumper beam, a material such as a steel sheet is used. The steel sheet used for the bumper beam has a thickness larger than a predetermined thickness to ensure the strength of the whole bumper beam. The bumper beam is manufactured by being integrally molded so as to match the length in the vehicle width direction by means of roll molding or press molding.

A bumper beam structure is disclosed in, for example, Japanese Patent Provisional Publication No. 2000-85496. In this vehicular bumper device, a recessed part is provided in the front surface of a bumper reinforce member, and one pipe-shaped reinforcing matter is attached to this recessed part so as to be fitted in the recessed part.

Further, Japanese Utility Model Publication No. 5-27315 discloses a bumper structure in which a pair of upper and lower reinforce members formed of a steel pipe are arranged at an upper part of a side frame.

However, in order to manufacture bumper beams having different shapes and sizes depending on the vehicle type and model, many kinds of press molding dies are needed to fabricate steel sheets. Also, in order to integrally press mold the bumper beam over the total length in the width direction of vehicle, a large molding die is needed, and further the manufacturing equipment is also increased in size. This requires high manufacturing cost and managing expense for the dies, so that it is not easy to reduce the manufacturing cost of vehicle as a whole.

Also, in order to decrease the weight of a bumper beam, it is necessary to decrease the material thickness thereof. However, a decrease in material thickness lowers the bending strength of the whole of the bumper beam. Therefore, there is a limit in achieving decreased weight and increased strength of the bumper beam at the same time.

On the other hand, in the structure described in Japanese Patent Provisional Publication No. 2000-85496, since the reinforcing matter is formed by only one pipe, shock energy is absorbed insufficiently.

Also, in the structure described in Japanese Utility Model Publication No. 5-27315, since the reinforce members are provided at the upper part of the side frame, for example, when a force is applied to the reinforce member from the outside of vehicle, the force is received only by the strength of the reinforcing members. To compensate for that, the steel pipe forming the reinforcing member is increased in size.

SUMMARY OF THE INVENTION

The present invention has been made in view of the above situation, and accordingly an object thereof is to provide a mounting structure of a bumper beam in which the weight is decreased while a sufficient strength is ensured by using two or more pipes.

To solve the problems with the related art, the present invention provides a mounting structure of a bumper beam for mounting the bumper beam to at least one of a front part or a rear part of a side frame which is provided on both sides in the vehicle width direction and extends in the longitudinal direction of vehicle, wherein the bumper beam has two or more pipes each having a length at least equal to a distance between the side frames, the pipes being arranged vertically one above another so that the outside surfaces of the pipes are located at the same position in the longitudinal direction of the vehicle, and a central position in the height direction of the bumper beam approximately coincides with a central position in the height direction of the side frame.

In a central portion in the vehicle width direction of the bumper beam, a bracket is provided so as to have a length of at least about one-fourth the length of the bumper beam and to connect the pipes to each other.

Also, regulating portions for regulating the vertical positions of the pipes are formed in the upper and lower end portions of the bracket.

Further, a strength increasing/decreasing portion is provided in an intermediate portion of the bracket in the vertical direction of the pipes.

As described above, in the present invention, the bumper beam is formed of pipes. Therefore, no large die for press molding is required, and the manufacturing cost and managing expense of dies can be reduced. Moreover, if an ordinary pipe is used, the cost can further be reduced.

Also, since the pipes are arranged vertically one above another so that the outside surfaces thereof are located at the same position in the longitudinal direction of the vehicle, when a force is applied from the outside of the vehicle, the force is distributed to and absorbed by the upper and lower pipes. Thereby, for example, when a force is applied to the bumper beam from the outside of the vehicle, the bumper beam can withstand a stronger force.

Further, since the bumper beam is arranged so that the central position in the height direction of the bumper beam approximately coincides with the central position in the height direction of the side frame, the side frame can receive the force applied from the outside of the vehicle. Thereby, the weight of the bumper beam can be reduced because the pipe need not have a larger shape than necessary.

In the central portion in the vehicle width direction of the bumper beam, the bracket is provided so as to have a length of at least about one-fourth the length of the bumper beam and to connect the pipes to each other. Therefore, the strength of the central portion of the bumper beam can further be increased, and the outside surfaces of the pipes can easily be arranged in line with each other. Also, since the upper and lower pipes are connected to each other, the deformation of upper and lower pipes becomes almost the same, so that energy is absorbed effectively.

Since the bracket has a length of at least about one-fourth the length of the bumper beam, the deformation mode of pipe of the bumper beam can be stabilized at the time of offset collision etc.

Since the regulating portions for regulating the vertical positions of the pipes are formed in the upper and lower end portions of the bracket, when a force is applied to the bumper beam from the outside of the vehicle, the pipes can be prevented from deforming vertically. Also, when the bumper beam is assembled, the vertical positioning of the pipes can be performed easily. Therefore, the assembling accuracy can be increased, which eliminates variations in assembly dimensions, so that the energy absorbing performance can be stabilized.

Also, the strength of the central portion of the bumper beam is adjusted by providing the strength increasing/decreasing portion in an intermediate portion of the bracket in the vertical direction of the pipes. Therefore, the strength necessary in the central portion of the bumper beam can be increased or decreased according to the type of vehicle.

DETAILED DESCRIPTION

Figure 1:
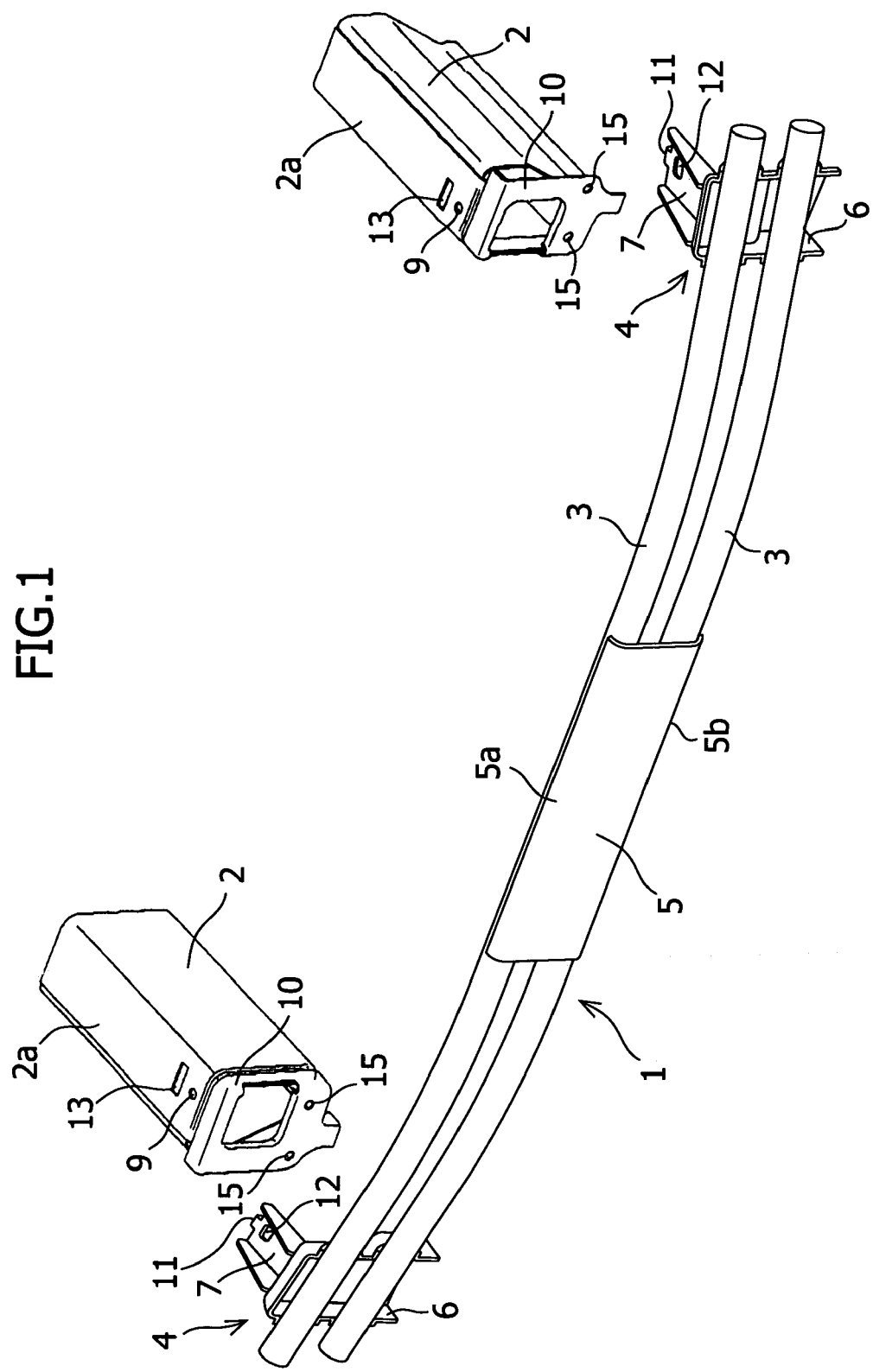
FIG. 1 is a general perspective view of a mounting structure of a bumper beam in accordance with an embodiment of the present invention.
Figure 2:
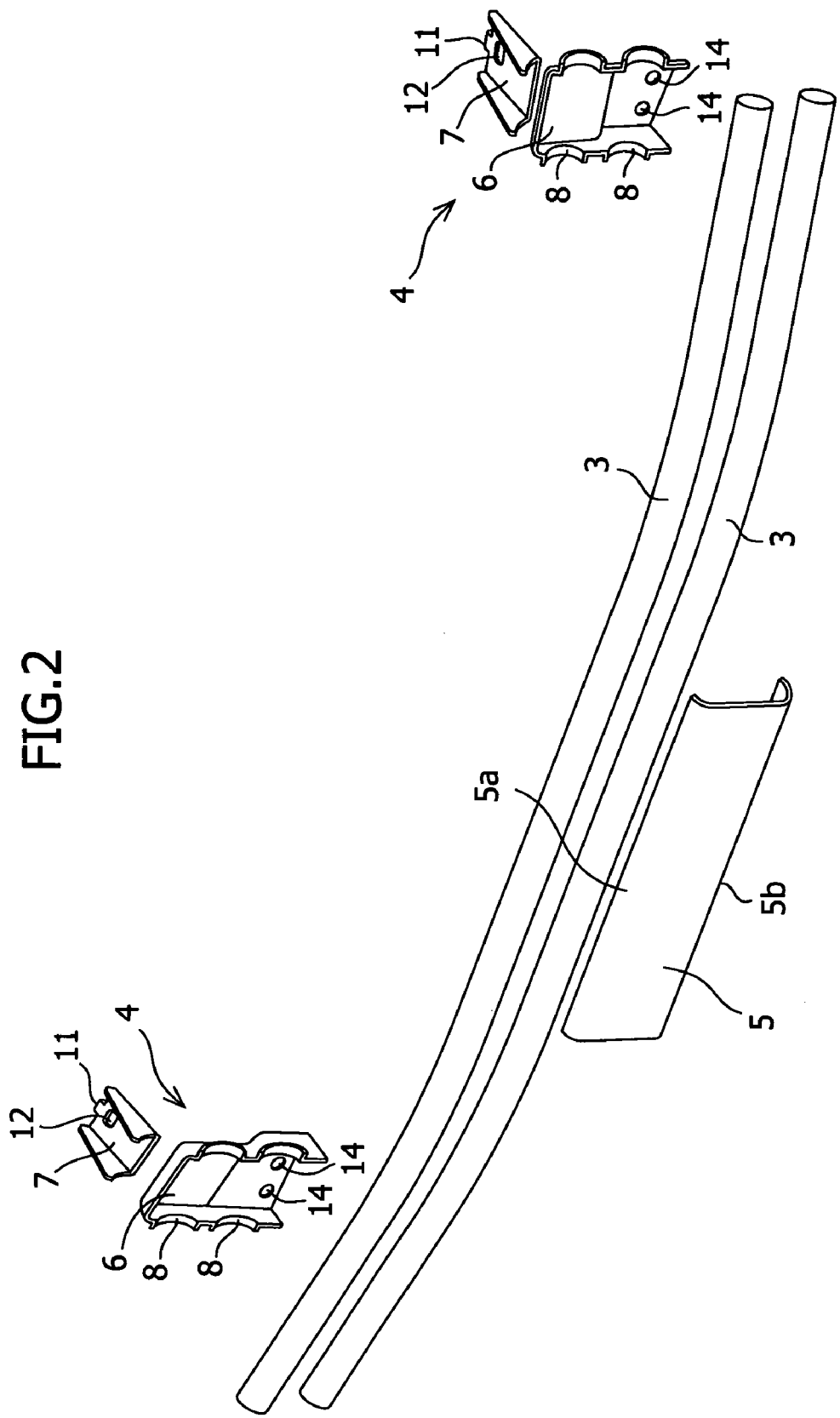
FIG. 2 is an exploded perspective view of a mounting structure of a bumper beam in accordance with an embodiment of the present invention.
Figure 3:
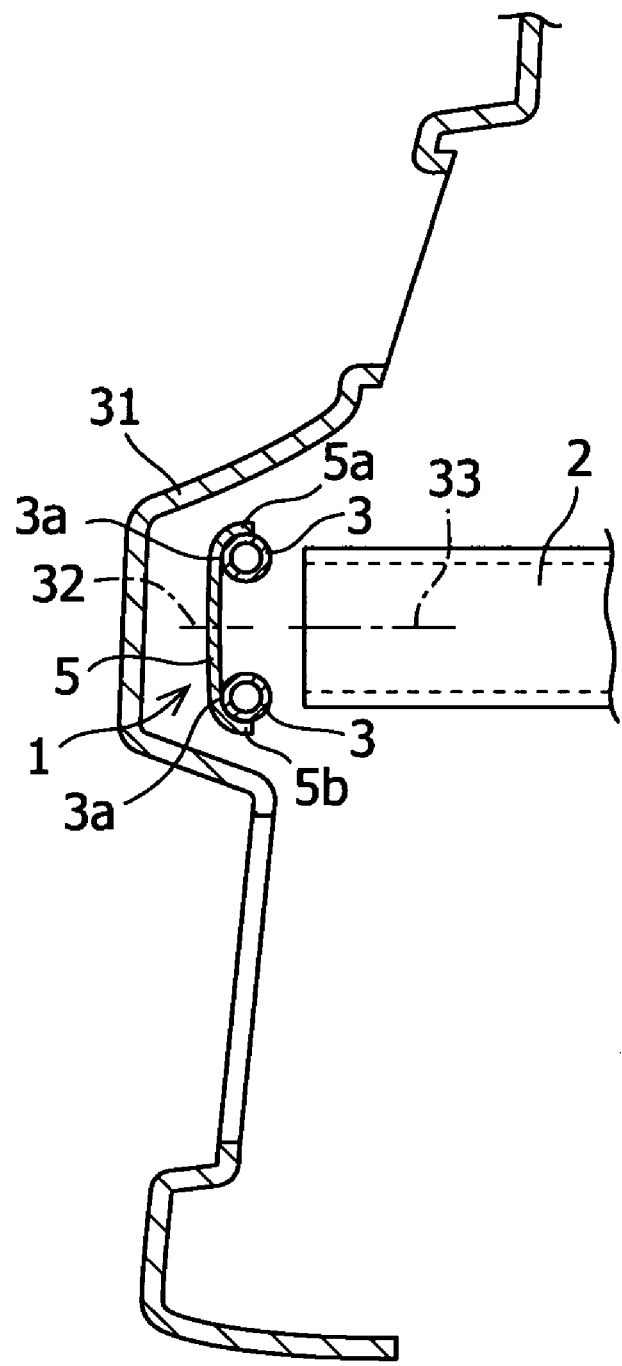
FIG. 3 is a sectional view of a mounting structure of a bumper beam in accordance with an embodiment of the present invention.

The best mode for carrying out the present invention will now be described in detail with reference to FIGS. 1 to 3. FIG. 1 is a perspective view showing a state before a bumper beam 1 is mounted to side frames 2, and FIG. 2 is an exploded perspective view showing the bumper beam 1 disassembled into parts. FIG. 3 is a sectional view showing the bumper beam mounted to the side frames 2, which is cut at a central portion in the vehicle width direction.

In this embodiment, explanation is given of a case where the number of pipes forming the bumper beam 1 is two. Also, in this embodiment, explanation is given of a mounting structure of a bumper beam for mounting the bumper beam 1 at a lower part on the front side of a vehicle.

In the mounting structure of a bumper beam shown in FIG. 1, the bumper beam 1 is mounted to the side frames 2 provided on the vehicle body side. As shown in FIGS. 1 and 2, the bumper beam 1 has two pipes 3, support members 4 for fixing both end portions in the vehicle width direction of the pipes 3, and a bracket 5 provided on the front side in a central portion in the vehicle width direction of the pipes 3. As shown in FIG. 3, a bumper cover 31 covers the front surface of the bumper beam 1 on the side opposite to the side frames 2 with the bumper beam 1 being held therebetween. The side frame 2 is formed of a steel pipe having a square cross section which is provided on both sides in the vehicle width direction so as to extend in the longitudinal direction of vehicle.

The two pipes 3 used for the bumper beam 1 are provided between the side frames 2 provided on both sides. The pipes 3 are arranged so that the lengthwise direction thereof substantially coincides with the vehicle width direction. The two pipes 3 are arranged vertically in parallel with each other, and front surfaces 3a (outside surfaces, refer to FIG. 3) of the pipes 3 are located at the same position in the longitudinal direction of the vehicle. Also, the two pipes 3 are bent delicately so as to match the bumper shape and the fixing positions of the support members 4. For these pipes 3, a high tensile strength steel such as STAM980 is used. This high tensile strength steel has a tensile strength about 150% of that of a non-tempered steel.

As shown in FIGS. 1 and 2, the support member 4 is formed by a pipe fixing member 6 and a side frame mounting member 7, and the pipe fixing member 6 and the side frame mounting member 7 are fixed integrally by welding.

The pipe fixing member 6 is manufactured by pressing a steel sheet. As shown in FIG. 2, the pipe fixing member 6 has a body portion extending vertically, and two arc-shaped recesses 8 (refer to FIG. 2) are provided in this body portion with a space provided in the vertical direction therebetween. The arc-shaped recess 8 is formed so that the shape thereof coincides with the external shape of the pipe 3. The end portions of the pipes 3 are arranged in these arc-shaped recesses 8, and are fixed thereto by welding. Also, as shown in FIG. 2, at a lower part of the pipe fixing member 6, two holes 14 are provided.

The positions in the height direction of the arc-shaped recesses 8 are such that as shown in FIG. 3, in the state in which the bumper beam 1 is mounted to the side frame 2, a central position 32 in the height direction of the bumper beam 1 approximately coincides with a central position 33 in the height direction of the side frame 2. More specifically, when the bumper beam is formed by two pipes 3, the upper pipe and the lower pipe are arranged so as to be at an approximately equal distance from the central position 33 in the height direction of the side frame 2 with the central position 33 being held between the two pipes.

As shown in FIGS. 1 and 2, the side frame mounting member 7 is formed so as to extend from an upper part of the pipe fixing member 6 toward the rear of the vehicle. At the rear end of the side frame mounting member 7, an engagement portion 11 is provided. This engagement portion 11 is formed by bending a rear end portion of the side frame mounting member 7 downward. Also, the side frame mounting member 7 is provided with a hole 12 (refer to FIG. 2) on the front side of the engagement portion 11.

On the other hand, in a top surface 2a of the side frame 2 shown in FIG. 1, an engagement hole 13 is provided so that the engagement portion 11 of the side frame mounting member 7 engages with the engagement hole 13. Also, in the top surface 2a, a mounting screw hole 9 is provided on the front side of the engagement hole 13. This screw hole 9 is provided so as to align with the hole 12 in the side frame mounting member 7 in the state in which the engagement portion 11 is engaged with the engagement hole 13.

Also, as shown in FIG. 1, in the tip end portion on the front side of the side frame 2, an attachment member 10 is provided so as to cover the opening of the square steel pipe of the side frame 2. At a lower part of the attachment member 10, screw holes 15 are provided. Like the screw hole 9, the screw holes 15 are provided so as to align with the holes 14 in the pipe fixing member 6 in the state in which the engagement portion 11 is engaged with the engagement hole 13.

The bracket 5 is provided on the front side in a central portion in the vehicle width direction of the two pipes 3, and has a length of at least about one-fourth the length of the bumper beam 1. As shown in FIG. 3, the bracket 5 is put on the front surfaces 3a of the two pipes 3 in a state of being in contact with them, and is fixed to the pipes 3 by welding of the periphery thereof. Also, an upper end portion 5a and a lower end portion 5b of the bracket 5 are bent toward the rear of the vehicle into a round shape such as to match the external shape of the pipe 3. The upper end portion 5a and the lower end portion 5b regulate the vertical position of the pipes 3 by being in contact with the upper or lower outer peripheral surface of the pipe 3.

Next, a method for mounting the bumper beam 1 to the side frame 2 is explained.

The bumper beam 1 is aligned with the side frame 2 by engaging the engagement portion 11 of the side frame mounting member 7 with the engagement hole 13 in the side frame 2 from the upside. A bolt, not shown, is inserted into the hole 12 from the upside, and the bolt is tightened, by which the side frame mounting member 7 is mounted to the side frame 2. Likewise, bolts, not shown, are inserted into the holes 14 and 15, and are tightened. Thereby, the bumper beam is mounted to the side frame 2.

Also, when this bumper beam 1 is used on a vehicle type having a different vehicle width, the lengths of the pipes 3 are changed. In this case, the shapes of the support member 4 and the bracket 5 need not be changed. Further, when this bumper beam 1 is applied to a vehicle type having a different vehicle height, the support member 4 and the bracket 5 are replaced with those that are manufactured so as to match the vehicle height. In this case, dies for the support member 4 and the bracket 5 must be manufactured newly. However, the newly manufactured dies may be smaller in size than the conventional dies.

Next, a strength test conducted on the mounting structure of a bumper beam in accordance with the embodiment of the present invention and the test results thereof are explained.

Figure 4:
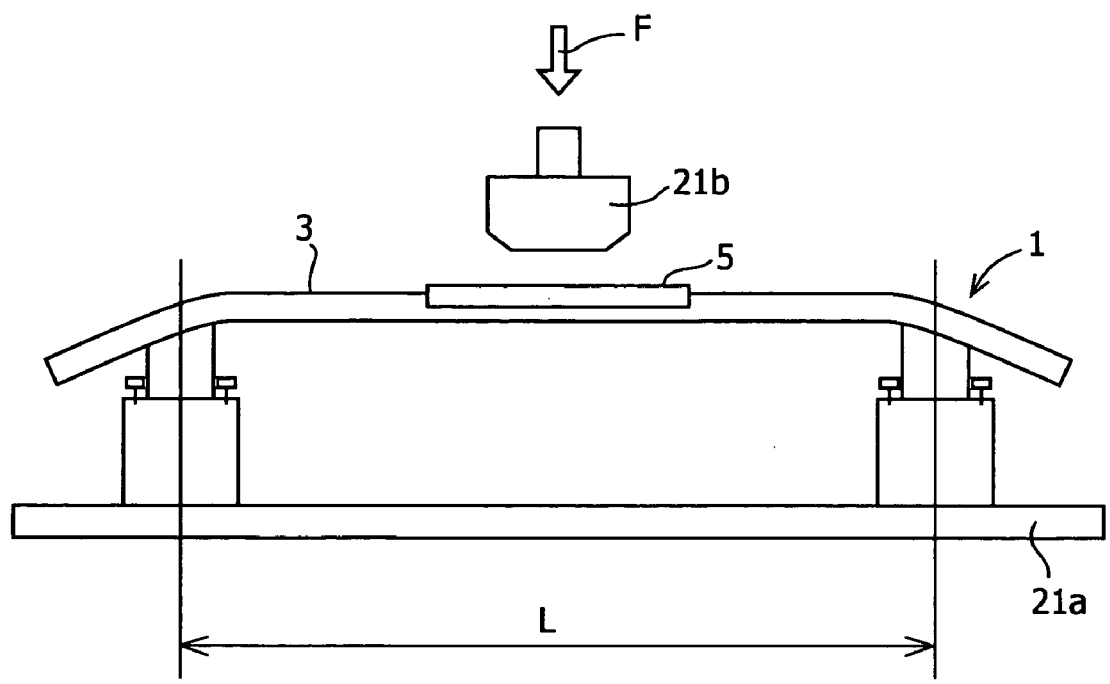
FIG. 4 is a schematic view showing a state of a load-displacement test for a mounting structure of a bumper beam in accordance with an embodiment of the present invention.
Figure 5:
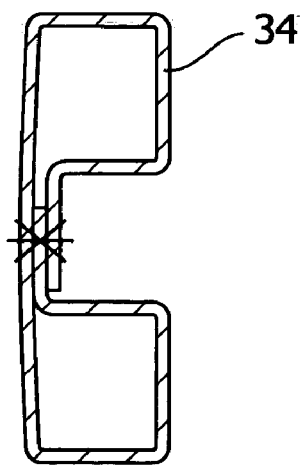
FIG. 5 is a sectional view of a conventional bumper beam.
Figure 6:
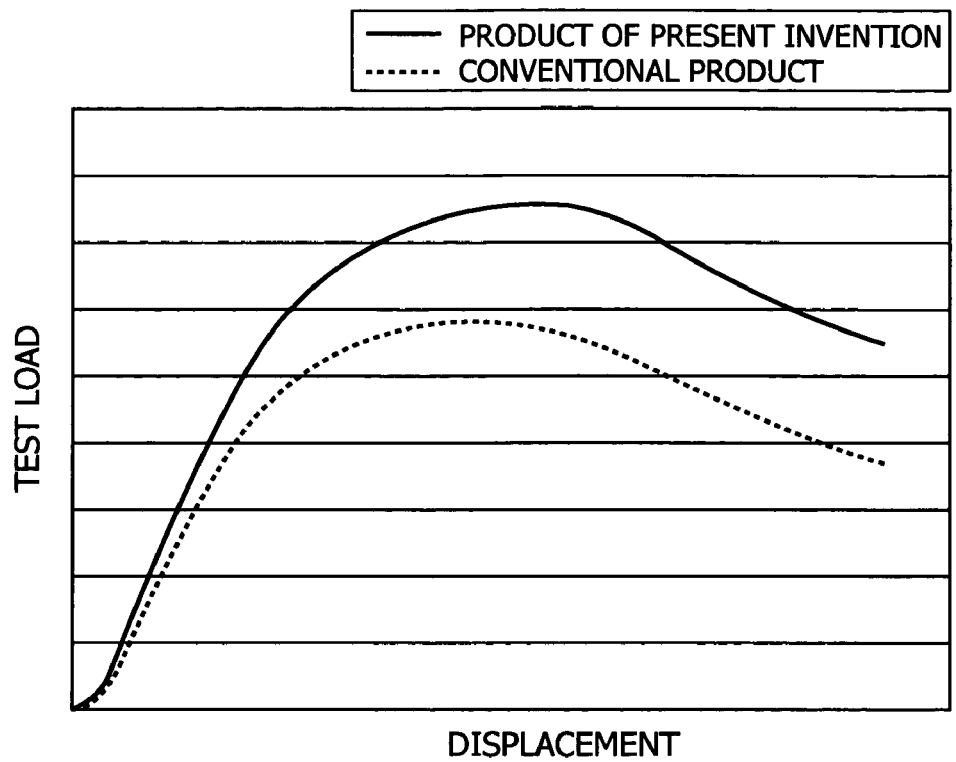
FIG. 6 is a graph showing a result of a load-displacement test, comparing the strength of a mounting structure of a bumper beam in accordance with an embodiment of the present invention with a conventional mounting structure.

FIG. 4 shows a state in which the mounting structure of a bumper beam in accordance with the embodiment of the present invention is subjected to a load test by using a three-point bending test machine. The bumper beam 1, which has been assembled in the same way as in the case where it is mounted to the vehicle, is set on a test jig 21a with the front side thereof being directed to the upside. The bumper beam 1 is set so as to receive a test load (bending load) in the central portion of the bumper beam 1 from a loading machine 21b that presses the bumper beam 1 downward. In this test, a setting pitch L of the bumper beam 1 is about 900 mm. Also, a load test was conducted under the same test conditions on a conventional bumper beam 34 having a cross-sectional shape shown in FIG. 5. This conventional bumper beam 34 was manufactured of a steel sheet having the same material and thickness as those of the pipe 3. FIG. 6 shows the relationship between test load F and displacement, which was obtained by this test.

From the test results shown in FIG. 6, it can be seen that the mounting structure of a bumper beam explained in the embodiment achieves an about 25 percent increase in strength as compared with the conventional structure. Also, the same test revealed that if the number of pipes 3 is decreased to one, the strength decreases compared with the conventional structure. Therefore, at least two pipes are used. Further, unless the two pipes 3 receive the test load F substantially at the same time, the load resistance decreases. Therefore, the two pipes 3 must be assembled so that the front surfaces 3a of the pipes 3 are located approximately the same position in the longitudinal direction of the vehicle.

For the mounting structure of a bumper beam in accordance with this embodiment of the present invention, the product cost can be reduced by about 15% and the die cost and the jig cost can be reduced by about 45% as compared with a conventional structure because the pipe 3 formed of an ordinary pipe is used. Also, the product weight can be reduced by about 20%.

Also, since the pipes 3 are arranged vertically and the outside surfaces 3a thereof are located at the same position in the longitudinal direction of the vehicle, when a force is applied from the outside of the vehicle, the force is distributed to and absorbed by the upper and lower pipes 3. Thereby, for example, when a force is applied to the bumper beam 1 from the outside of the vehicle, the bumper beam 1 can withstand a stronger force.

Further, since the bumper beam 1 is arranged so that the central position 32 in the height direction of the bumper beam 1 approximately coincides with the central position 33 in the height direction of the side frame 2, the side frame 2 can receive, via the support member 4, the force applied from the outside of the vehicle. Thereby, the weight of the bumper beam 1 can be reduced because the pipe 3 need not have a larger shape than necessary.

In the central portion in the vehicle width direction of the bumper beam 1, the bracket 5 is provided so as to have a length of at least about one-fourth the length of the bumper beam 1 and to connect the pipes 3 to each other. Therefore, the strength of the central portion of the bumper beam 1 can further be increased, and the outside surfaces 3a of the pipes 3 can easily be located at the same position in the longitudinal direction of the vehicle.

Since regulating portions for regulating the vertical positions of the pipes 3 are formed in the upper and lower end portions of the bracket 5, when a force is applied to the bumper beam 1 from the outside of the vehicle, the pipes 3 can be prevented from deforming vertically. Also, when the bumper beam 1 is assembled, the vertical positioning of the pipes 3 can be performed easily.

The above is description of one embodiment of the present invention. The present invention is not limited to the above-described embodiment, and various changes and modifications can be made based on the technical concept of the present invention.

For example, when this mounting structure of a bumper beam is used for a large vehicle, three or more pipes 3 can be used to increase the load resistance. In this case, provision can be made easily by increasing the number of arc-shaped recesses 8 in the support member 4 and by changing the shape of the bracket 5. Also, in the embodiment of the present invention, the case where the pipe 3 is formed of a round pipe has been described. However, the use of a square pipe or an irregularly shaped pipe achieves the same effect.

Figure 8:
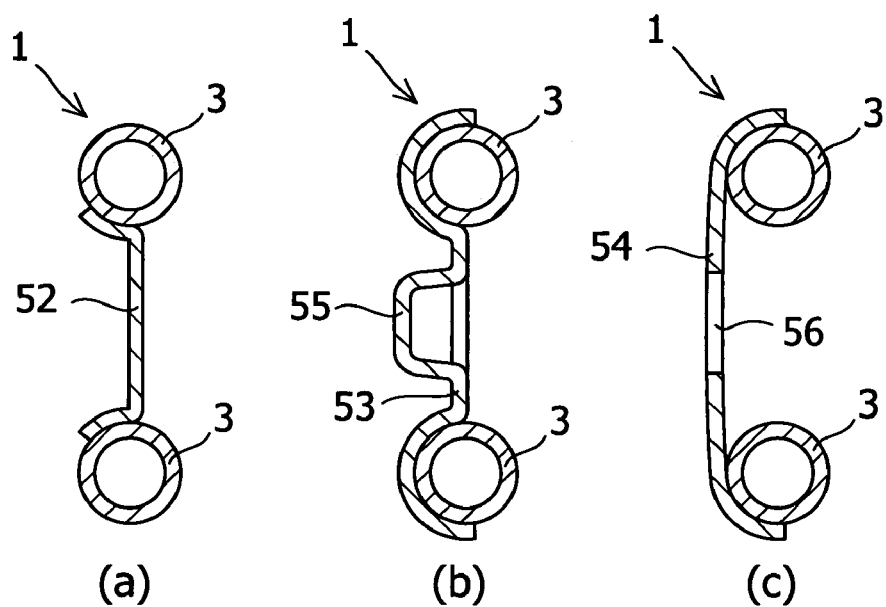
FIG. 8 is a sectional view showing brackets used for a mounting structure of a bumper beam in accordance with another embodiment of the present invention, FIGS. 8(a) to 8(c) showing modifications of the bracket.
Figure 7:
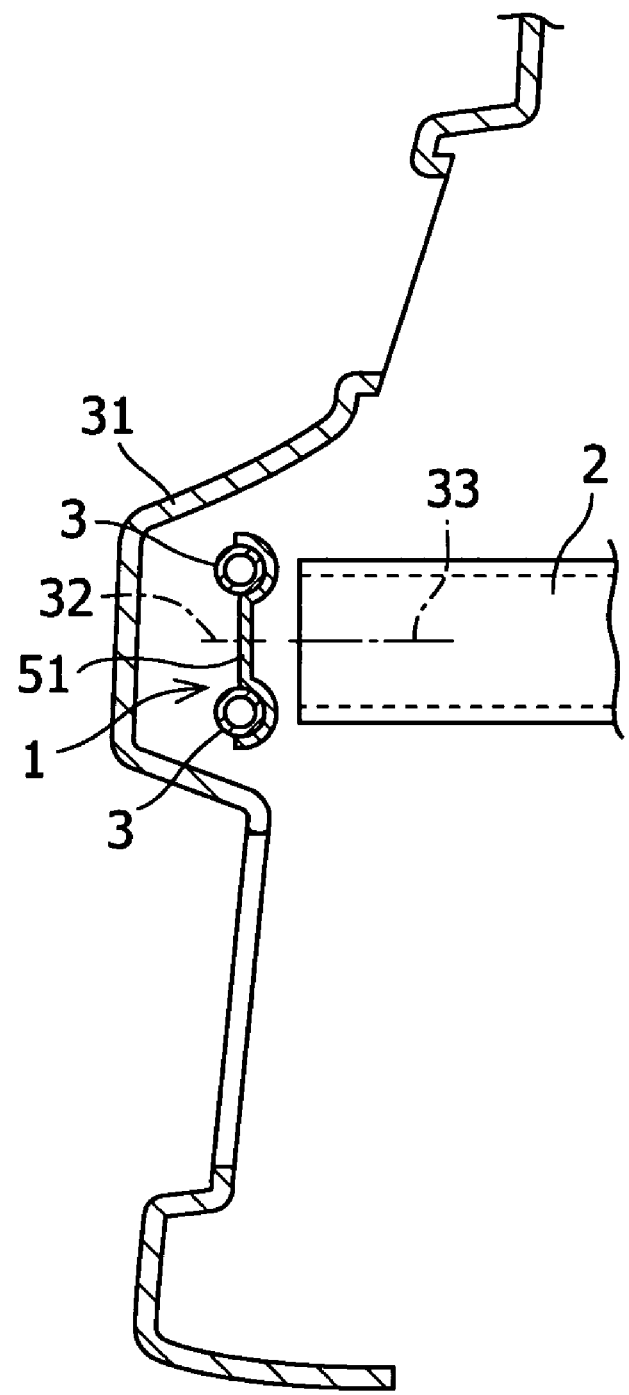
FIG. 7 is a sectional view of a mounting structure of a bumper beam in accordance with another embodiment of the present invention.

As shown in FIG. 7 and FIGS. 8(a) to 8(c), the bracket 5 having a different cross-sectional shape is selected and installed to the bumper beam 1, by which the strength of the central portion of bumper beam can be increased or decreased so as to match the kind of vehicle. The cross-sectional shape of a bracket 51 shown in FIG. 7 is formed by installing the bracket 51 from the back side of the pipes 3 and by bending the central portion in the height direction so that the central portion extend along a plane on which the two pipes 3 are opposed to each other. The cross-sectional shape of a bracket 52 shown in FIG. 8(a) is formed by bending the bracket 52 so that the upper and lower end portions thereof are fitted along the opposed surfaces of the two pipes 3. The cross-sectional shape of a bracket 52 shown in FIG. 8(*b*) is formed by bending the central portion in the height direction so that the central portion extend along a plane on which the two pipes 3 are opposed to each other and further by forming a convex portion 55 in the central portion. Thereby, the strength of the central portion of the bumper beam 1 is. increased. The cross-sectional shape of a bracket 52 shown in FIG. 8(*c*) is formed by providing a hole 56 in the central portion. Thereby, the strength of the central portion of the bumper beam 1 is decreased.

In the present invention, explanation has been given of the mounting structure of a bumper beam on the front side of vehicle. However, the present invention can be applied similarly to the mounting structure of a bumper beam on the rear side of vehicle. When the present invention is applied to the mounting structure of a bumper beam on the rear side of a vehicle (rear bumper), the mounting position and shape of the support member 4 can be changed appropriately so as to match the structure on the rear side of vehicle.

For the pipe 3, any materials having various strengths ranging from a lower high tensile strength steel to an ultra high tensile strength can be used as necessary.

The invention claimed is:

1. A bumper beam assembly for a vehicle including first and second side frames comprising:
 a bumper beam having at least two round pipes said bracket having an upper end portion and a lower end portion;
 a bracket for connecting said at least two round pipes; and
 first and second support members capable of supporting said at least two round pipes, said first and second support members each having one end mounted to said first and second side frames, respectively,
 said at least two round pipes having a length at least equal to a distance between said first and second side frames and a sum of the diameters of said at least two round pipes being smaller than a height of said bumper beam assembly, said at least two round pipes being arranged vertically one above another;
 said bracket having a length of at least one-fourth the length of said bumper beam wherein said upper end portion and said lower end portion of said bracket are formed into a rounded shape so as to match external shapes of said at least two round pipes, said rounded shapes of said upper and lower end portions being connected to said at least two round pipes;
 said first and second support members including at least two arc-shaped recesses which conform to the external shape of said at least two round pipes, said first and second support members supporting each of said at least two round pipes with said arc-shaped recesses, thereby connecting said first and second side frames to said at least two round pipes; and
 one of said at least two round pipes being positioned below a central point of said first and second side frames, and the other of said at least two round pipes being positioned above said central point.

2. The bumper beam assembly of claim 1, wherein said arc-shaped recesses are oriented in the same direction.

3. The bumper beam assembly of claim 1, wherein said at least two round pipes are spaced apart from one another in the vertical direction.

4. The bumper beam assembly according to claim 1, wherein a central portion of said bracket may be arranged and constructed in a first configuration which will increase the strength of said central portion of said bumper beam or a second configuration which will decrease the strength of said central portion of said bumper beam, so as to permit said bracket to be used with bumper beam assemblies of different sizes.

5. The bumper beam assembly according to claim 1, wherein said rounded shapes regulate vertical positions of said as least two round pipes.

* * * * *

UNITED STATES PATENT AND TRADEMARK OFFICE
CERTIFICATE OF CORRECTION

PATENT NO. : 7,044,516 B2 Page 1 of 1
APPLICATION NO. : 10/996511
DATED : May 16, 2006
INVENTOR(S) : Akira Kobayashi et al.

It is certified that error appears in the above-identified patent and that said Letters Patent is hereby corrected as shown below:

Cover page, (74) under Attorney, Agent, or Firm, "Krumholdz" should read --Krumholz--.
Col. 7, line 9, "is. increased." should read --is increased.--

Signed and Sealed this

Twenty-first Day of November, 2006

JON W. DUDAS
*Director of the United States Patent and Trademark Office*